United States Patent
Kim et al.

(10) Patent No.: US 8,927,172 B2
(45) Date of Patent: Jan. 6, 2015

(54) FLAT-TUBULAR SOLID OXIDE CELL STACK

(75) Inventors: Sun-Dong Kim, Daejeon (KR); Ji-Haeng Yu, Daejeon (KR); In-Sub Han, Daejeon (KR); Doo-Won Seo, Daejeon (KR); Kee-Seog Hong, Daejeon (KR); Se-Young Kim, Seongnam-si (KR); Sang-Kuk Woo, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 97 days.

(21) Appl. No.: 13/389,910

(22) PCT Filed: Dec. 15, 2010

(86) PCT No.: PCT/KR2010/008964
§ 371 (c)(1),
(2), (4) Date: Feb. 10, 2012

(87) PCT Pub. No.: WO2012/015113
PCT Pub. Date: Feb. 2, 2012

(65) Prior Publication Data
US 2012/0141903 A1   Jun. 7, 2012

(30) Foreign Application Priority Data

Jul. 30, 2010   (KR) .................. 10-2010-0074309
Jul. 30, 2010   (KR) .................. 10-2010-0074311

(51) Int. Cl.
| H01M 8/10 | (2006.01) |
| H01M 8/24 | (2006.01) |
| H01M 8/12 | (2006.01) |

(52) U.S. Cl.
CPC ............ *H01M 8/2435* (2013.01); *H01M 8/122* (2013.01); *Y02E 60/521* (2013.01); *Y02E 60/525* (2013.01)
USPC ........... 429/465; 429/457; 429/466; 429/467; 429/458

(58) Field of Classification Search
USPC .......................... 429/457, 458, 465, 467, 466
See application file for complete search history.

(56) References Cited

U.S. PATENT DOCUMENTS

| 5,458,989 A * | 10/1995 | Dodge .......................... 429/492 |
| 2003/0224240 A1 | 12/2003 | Yamashita et al. |
| 2004/0185318 A1 * | 9/2004 | Novak ............................ 429/32 |

FOREIGN PATENT DOCUMENTS

| JP | 2006-253071 | 9/2006 |
| JP | 2009-054599 | 3/2009 |

(Continued)

OTHER PUBLICATIONS

Thesaurus.com http://thesaurus.com/browse/transverse 2014.*

(Continued)

*Primary Examiner* — Stewart Fraser
*Assistant Examiner* — Olatunji Godo
(74) *Attorney, Agent, or Firm* — Hamre, Schumann, Meuller & Larson, P.C.

(57) ABSTRACT

Disclosed herein is a flat-tubular solid oxide cell stack. The cell stack includes a plurality of unit cells which are stacked one on top of another. Each unit cell includes a flat-tubular electrode support made of a porous conductive material. A first-gas flow channel is formed in the electrode support in a longitudinal direction thereof. First gas flows along the first-gas flow channel. A second-gas flow channel is formed on the outer surface of the electrode support. Second-gas flows along the second-gas flow channel. A connection hole is formed on each of opposite ends of the first-gas flow channel of each of the unit cells and communicates with the first-gas flow channel of the adjacent unit cell so that the first gas flows along the unit cells in a zigzag manner in the longitudinal directions of the unit cells.

9 Claims, 11 Drawing Sheets

(56) References Cited

FOREIGN PATENT DOCUMENTS

| | | |
|---|---|---|
| JP | 2009-129851 | 6/2009 |
| KR | 10-2003-0066042 | 8/2003 |
| KR | 10-2005-0021027 | 3/2005 |
| KR | 10-2009-0084160 | 8/2009 |
| KR | 10-2009-0104548 | 10/2009 |
| KR | 10-2010-0057965 | 6/2010 |
| KR | 10-2010-0072802 | 7/2010 |
| KR | 10-2011-0113458 | 10/2011 |

OTHER PUBLICATIONS

International Search Report for international application No. PCT/KR2010/008964, dated Aug. 18, 2011 (2 pages).

* cited by examiner

FIG. 11

FLAT-TUBULAR SOLID OXIDE CELL STACK

TECHNICAL FIELD

The present invention relates generally to flat-tubular solid oxide cell stacks and, more particularly, to a flat-tubular solid oxide cell stack which is configured such that the stress of a cell stacking structure is minimized, a portion to be sealed is minimized, the length of a path for a chemical reaction is increased, the efficiency with which electricity is generated is enhanced when it is used as a fuel cell, and the purity of generated gas (hydrogen) is increased when it is used as a high-temperature electrolyzer cell.

BACKGROUND ART

Generally, fuel cells use high-efficiency clean electricity generation technology in which oxygen in the air and hydrogen contained in a hydrocarbon material, such as natural gas, coal gas, methanol, etc., are directly converted into electric energy by an electrochemical reaction. According to the kind of electrolyte, fuel cells are classified into an alkali fuel cell, a phosphoric acid fuel cell, a molten carbonate fuel cell, a solid oxide fuel cell and a polymer electrolyte fuel cell.

The solid oxide fuel cell (SOFC), all components of which are solid, is operated at a high temperature ranging from 600° C. to 1000° C. Among the several types of existing fuel cells, the SOFC has the highest efficiency and the lowest pollution rate. In addition, the SOFC has other several advantages in which a fuel reformer is not required, and it can be easily used in a combined electricity generation system. Further, the SOFC can be used as a high-temperature solid oxide electrolyzer cell (SOEC) by performing an inverse electrochemical reaction.

Electrochemistry reaction devices, such as the solid oxide fuel cell, the high-temperature electrolyzer cell, etc., are classified into a flat type and a cylindrical type, according to the shape. The flat type electrochemistry reaction device has the advantage of high power density (output) but is disadvantageous in that the area of a portion to be sealed for gas is comparatively large, there is a thermal shock that occurs because of the difference in coefficients of expansion between components when stacked, and it is difficult to greatly increase the size thereof. The cylindrical type electrochemistry reaction device has high resistance to heat stress and high mechanical strength and can have a large size because it is manufactured by extruding. However, the cylindrical type is disadvantageous in that power density (output) is low.

Representative examples of flat-tubular electrochemistry reaction devices (for example, flat-tubular solid oxide fuel cells) that take advantage of the flat type electrochemistry reaction device and the cylindrical type electrochemistry reaction device were proposed in Korean Patent Laid-open Publication No. 2005-0021027 and US Patent No. 2003-0224240A1. Flat-tubular electrochemistry reaction devices have a stack structure in which cells are stacked one on top of another to enhance the output. However, there is a difficulty in collecting current at the anode and cathode sides. Further, the number of gas flow manifolds increases in proportion to the number of cells, and it is not easy to reliably seal the stack structure to prevent gas from leaking.

Meanwhile, a flat-tubular electrode support and a unit cell for a solid oxide fuel cell were proposed in Korean Patent Laid-open Publication No. 2009-0084160. A cell stack using the electrode support and the unit cell was proposed in Korean Patent Laid-open Publication No. 2009-0104548.

However, in the conventional electrochemistry reaction devices (the flat-tubular solid oxide fuel cell and the flat-tubular high-temperature electrolyzes cell), a cell stack is configured in such a way that metal connection plates are formed in semi-arc shapes or planar shapes, and ceramic cells are seated on the corresponding metal connection plates. Therefore, due to a difference in a coefficient of expansion between the ceramic cells and the metal connection plates, the cells may be damaged. Further, the metal connection plates may be oxidized by making contact with air, thus reducing the current collection performance.

In addition, in the conventional electrochemistry reaction devices (the flat-tubular solid oxide fuel cell and the flat-tubular high-temperature electrolyzer cell), manifold portions are sealed to isolate an oxidizer (air or oxygen) supply part from a reducer (hydrogen or hydrocarbon) supply part. When cells are stacked one on top of another to enhance the output, the number of gas flow manifolds increases in proportion to the number of stacked cells. Because the shape of each manifold portion to be sealed is complex, it is not easy to reliably seal the gas. Moreover, it is difficult to determine a gas sealing structure and a sealing material, because the operating temperature is comparatively high.

Accordingly, the present invention has been made keeping in mind the above problems occurring in the prior art, and an object of the present invention is to provide a flat-tubular solid oxide cell stack which is configured such that the stress of a cell stacking structure is minimized, a portion to be sealed is minimized, the length of a path for a chemical reaction is increased, the efficiency with which electricity is generated is enhanced when it is used as a fuel cell, and the purity of generated gas (hydrogen) is increased when it is used as a high-temperature electrolyzer cell.

TECHNICAL SOLUTION

In order to accomplish the above object, the present invention provides a flat-tubular solid oxide cell stack, including a plurality of unit cells stacked one on top of another, each of the unit cells comprising a flat-tubular electrode support made of a porous conductive material, with at least one first-gas flow channel formed in the electrode support in a longitudinal direction thereof, first gas flowing along the first-gas flow channel, and at least one second-gas flow channel formed in an outer surface of the electrode support, second-gas flowing along the second-gas flow channel, wherein a connection hole is formed on each of opposite ends of the first-gas flow channel of each of the unit cells and communicates with the first-gas flow channel of the adjacent unit cell so that the first gas flows along the unit cells in a zigzag manner in the longitudinal directions of the unit cells.

The flat-tubular solid oxide cell stack may further include a first-gas flow manifold connected to one end of the first-gas flow channel of each of uppermost and lowermost ones of the unit cells.

The flat-tubular solid oxide cell stack may further include a first-gas flow manifold connected to one end of the first-gas flow channel of a medial one of the unit cells so that the first gas diverges up and down from a medial portion of the cell stack and then flows along the corresponding unit cells in zigzag manners in the longitudinal directions of the unit cells.

The end of each of the first-gas flow channels of the unit cells to which the corresponding first-gas flow manifold is connected may be open in the longitudinal direction of the unit cell.

Furthermore, a ceramic conductor may be attached to the outer surface of each of the unit cells in which the second-gas flow channel is formed or to a surface of the unit cell that is disposed opposite the second-gas flow channel, the ceramic conductor allowing electric connection or precipitation.

In addition, an annular sealing groove may be formed in each of the unit cells around the connection hole, and a sealing ring is inserted into the sealing groove to prevent gas from leaking through the connection hole.

The first-gas flow channel may comprise a plurality of first-gas flow channels. The connection hole may comprise a plurality of connection holes arranged in a circumferential direction. The connection holes may communicate with the first-gas flow channels. The sealing groove may surround the connection holes.

The first-gas flow channel may comprise a plurality of first-gas flow channels. The connection holes may comprise: a plurality of large holes, each of which communicates with corresponding adjacent two of the first-gas flow channels; and a plurality of small holes, each of which communicates with corresponding one of the first-gas flow channels, wherein the large holes and the small holes are arranged in a circular or semi-circular shape in a circumferential direction. The sealing groove may surround the large holes and the small holes.

The first-gas flow channel may comprise a plurality of first-gas flow channels. A connection passage may be formed in an end of the first-gas flow channels to communicate the first-gas flow channels to each other.

The sealing groove may comprise sealing grooves respectively formed in the adjacent unit cells in such a way as to face each other.

The sealing ring may be made of paste or tape based on ceramic (glass, mica, silica, etc.) or metal (silver, gold, etc.).

ADVANTAGEOUS EFFECTS

In a flat-tubular solid oxide cell stack according to the present invention, when a cell stack is formed, a separate metal connector is not required, and the area of a complex manifold portion to be sealed is minimized. Therefore, the stress of a cell stacking structure is minimized. Because the number of manifold portions is reduced, the structure of the cell stack is simplified.

Furthermore, first gas flows along unit cells in the longitudinal directions of the unit cells in a zigzag manner, thus increasing the length of a path for a chemical reaction. Thereby, when the cell stack is used as a fuel cell, the efficiency with which electricity is generated is enhanced. When the cell stack is used as a high-temperature electrolyzer cell, the purity of generated gas (hydrogen) can be increased.

In addition, because flat-tubular unit cells which are closed on the opposite ends thereof are used, a portion to be sealed can be minimized in consideration of the flow of gas and mechanical characteristics. Because of a sealing material (ring) inserted into a sealing groove, the sealing effect can be enhanced. A gap is prevented from being formed between adjacent unit cells. The sealing ring is prevented from melting and flowing at high temperature.

Moreover, despite using very small connection holes to connect gas channels between the unit cells and a reduced portion to be sealed, the cell stack structure can be reliably realized by stacking the flat-tubular unit cells one on top of another.

| | | | |
|---|---|---|---|
| 100, 200, 300: | cell stack | 110, 210, 310: | first unit cell |
| 111a, 121a: | first electrode support | 111b, 121b: | first electrode medial layer |
| 111c, 121c: | electrolytic layer | 111e, 121e: | second electrode layer |
| 112, 122, 332: | first-gas flow channel | 113, 123, 333: | second-gas flow channel |
| 114, 124, 334: | connection hole | 115, 125, 335: | ceramic conductor |
| 116, 126, 336: | sealing groove | 120, 220, 320: | second unit cell |
| 140, 240, 340: | first-gas inlet manifold | 140', 240', 340': | first-gas outlet manifold |
| 150, 150': | sealing ring | 330: | third unit cell |

BEST MODE

Hereinafter, preferred embodiments of the present invention will be described in detail with reference to the attached drawings.

A flat-tubular solid oxide cell stack according to the present invention can be used as a fuel cell or a high-temperature electrolyzer cell. In the following description, the flat-tubular solid oxide cell stack will be illustrated as being used as a fuel cell.

Figure 1:
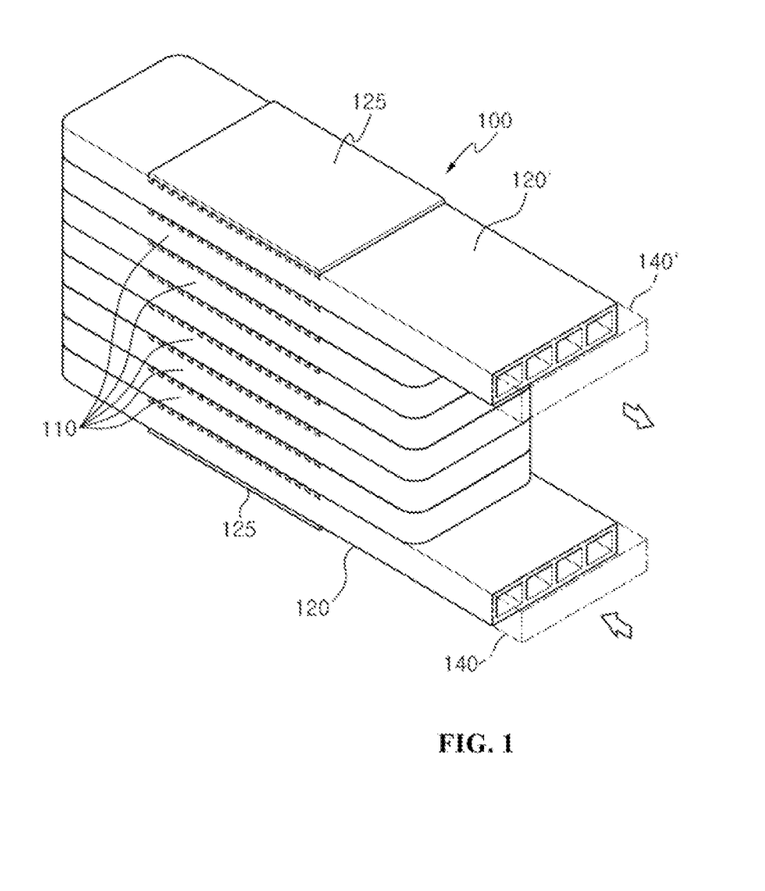
FIG. 1 is a view showing the construction of a flat-tubular solid oxide cell stack, according to a first embodiment of the present invention.
Figures 2A, 2B:
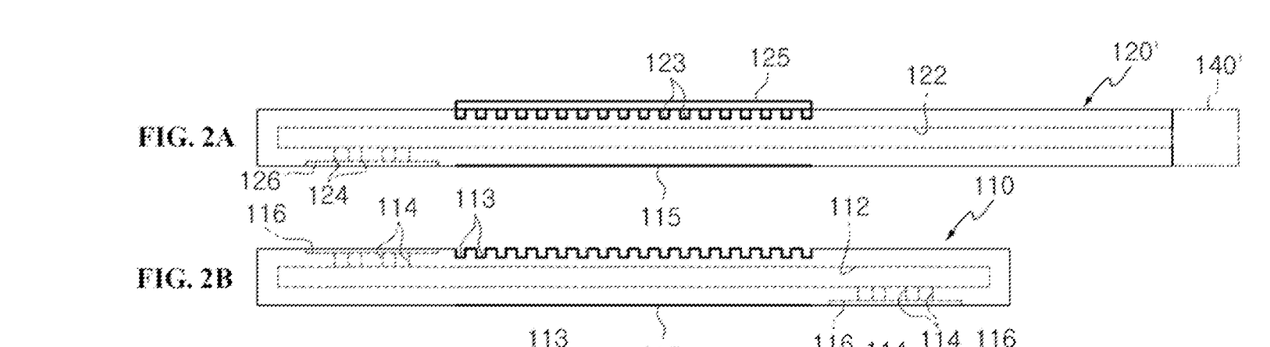
FIG. 2 is an exploded view showing unit cells of the cell stack of FIG. 1.
Figures 2C, 2D, 2E:
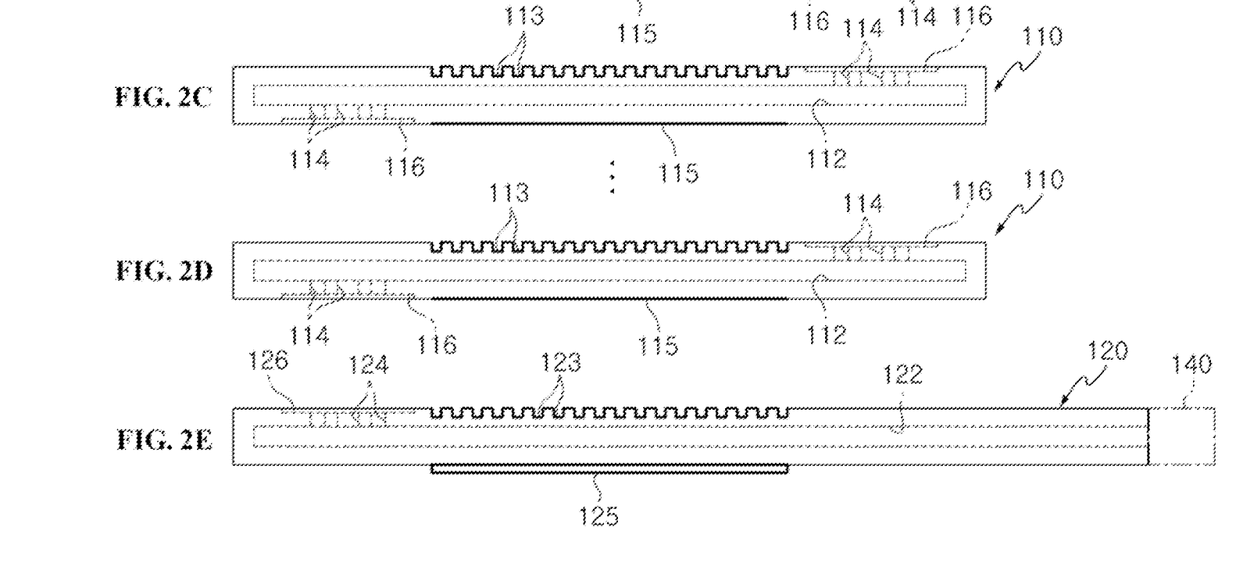

FIG. 1 is a view showing the construction of a flat-tubular solid oxide cell stack, according to a first embodiment of the present invention. FIG. 2 is an exploded view showing unit cells of the cell stack of FIG. 1. As shown in the drawings, the flat-tubular solid oxide cell stack 100 for a fuel cell includes a plurality of first unit cells 110 which are stacked one on top of another in the vertical direction, and second unit cells 120 and 120' which are respectively disposed on the lowermost layer and the uppermost layer of the stacked first unit cells 110. First-gas flow manifolds (a first-gas inlet manifold 140 and a first-gas outlet manifold 140') are respectively mounted to the second unit cells 120 and 120' so that first gas (hydrogen or hydrocarbon) enters the first-gas inlet manifold 140 and comes out of the first-gas outlet manifold 140'.

Figure 3A:
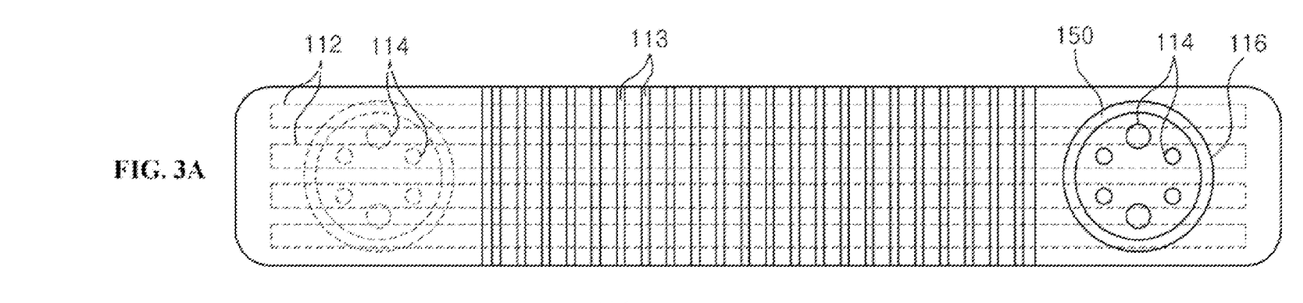
FIGS. 3A and 3B are, respectively, a plan view and a sectional view showing a first unit cell of FIG. 2.
Figure 3B:
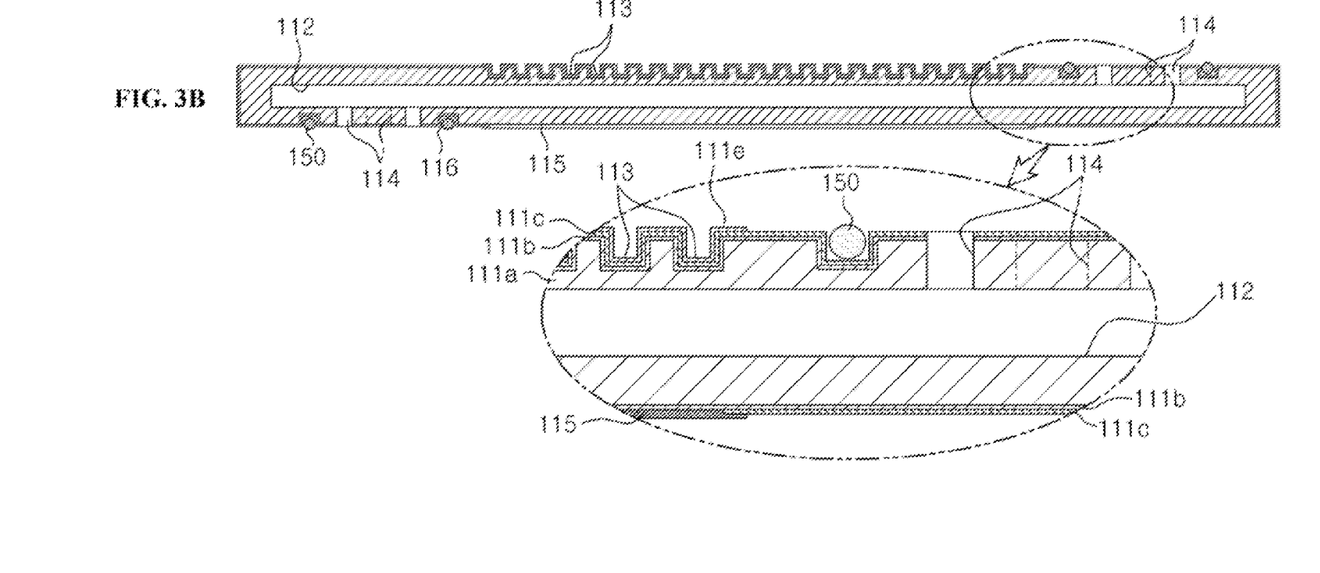

FIGS. 3A and 3B, in each first unit cell 110, a plurality of first-gas flow channels 112 along which first gas flows are formed in a first electrode support 111a in the longitudinal direction. A plurality of second-gas flow channels 113 along which second gas (air or oxygen) flows are formed in an outer surface of one side of the first electrode support 111a in a direction crossing the first-gas flow channel 112 (that is, in the lateral direction of the first electrode support 111a). A plurality of connection holes 114 are formed in opposite ends of the first-gas flow channels 112 and communicate with the first-gas flow channels 112 of the adjacent stacked unit cells 110 so that first gas flows in the longitudinal directions of the first unit cells 110 in a zigzag manner. A ceramic conductor 115 to allow electrical connection is provided on the other side of the first electrode support 111a that is disposed opposite the second-gas flow channels 113. The ceramic conductor 115 is applied to a first electrode medial layer which will be explained later herein.

Each first unit cell 110 includes the first electrode support 111a, the first electrode medial layer 111b, an electrolytic layer 111c and a second electrode layer 111e. The first electrode support 111a is made of a porous conductor including material for a fuel electrode (anode) or for an air electrode (cathode). The first electrode medial layer 111b covers an entire outer surface of the first electrode support 111a. The electrolytic layer 111c covers an outer surface of the first electrode medial layer 111b other than the ceramic conductor 115. The second electrode layer 111e is applied to the portion of the outer surface of the electrolytic layer 111c on which the second-gas flow channel 113 is formed.

The electrode material of the first electrode support 111a and the first electrode medial layer 111b may be NiO-YSZ (nickel oxide-yttria stabilized zirconia) material. The electrode material of the second electrode layer 111e may be LSM (LaSrMnO$_3$). The electrolytic layer 111c may be made of YSZ material. Further, a variety of electrode materials can be used as the materials of these elements.

The first electrode medial layer 111b and the second electrode layer 111e are porous to allow diffusion of gas. The electrolytic layer 111c and the ceramic conductor 115 comprise dense layers which have no pores so as to prevent the first gas and the second gas from mixing with each other.

The first-gas flow channels 112 are close on the longitudinal opposite ends thereof. Two groups of connection holes 114 are respectively formed in the longitudinal opposite ends of the first-gas flow channels 112 and are oriented in the opposite directions. The second-gas flow channels 113 are formed in the medial portion of the first unit cell 110 and extend in the lateral direction of the first unit cell 110.

Each group of connection holes 114 includes a plurality of large holes 114a each of which communicates with two first-gas flow channels 112 together, and a plurality of small holes 114b each of which communicates with one first-gas flow channel 112. The large holes 114a and the small holes 114b that communicate with the corresponding first-gas flow channels 112 are arranged in a circumferential direction to form a circular shape.

Figure 5A:
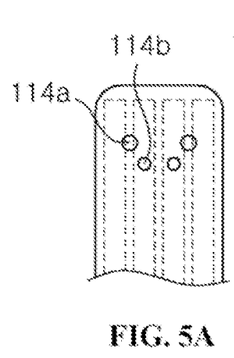
FIGS. 5A through 5I are views illustrating several examples of connection holes of a unit cell used in the present invention.
Figure 5B:
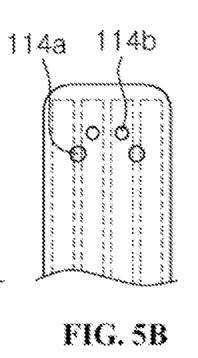

As shown in FIGS. 5A and 5B, the connection holes 114 may comprise a plurality of large holes 114a and a plurality of small holes 114b which are arranged in a semicircular shape and communicate with the corresponding first-gas flow channels 112.

Figure 5C:
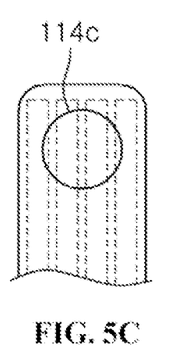

Alternatively, as shown in FIG. 5C, a single connection hole 114c may be formed in such a way as to communicate with the first-gas flow channels 112.

Figure 5D:
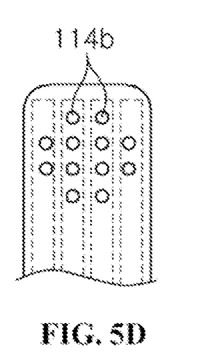
Figure 5E:
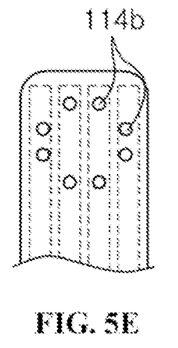

As a further alternative, as shown in FIG. 5D, the connection holes 114 may comprise a plurality of small holes 114b which communicate with the first-gas flow channels 112 in such a way that small holes 114b are formed in each first-gas flow channel 112 and the small holes 114b of the first-gas flow channels 112 are uniformly distributed in the entire area of a circle defined by the arrangement of the small holes 114b. As shown in FIG. 5E, the connection holes 114 may comprise a plurality of small holes 114b which communicate with the first-gas flow channels 112 in such a way that small holes 114b are formed in each first-gas flow channel 112 and the small holes 114b of the first-gas flow channels 112 are arranged in a circumferential direction to form a circular shape.

Figure 5F:
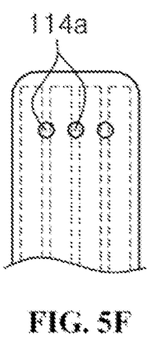
Figure 5G:
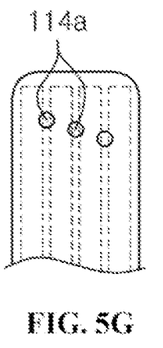
Figure 5H:
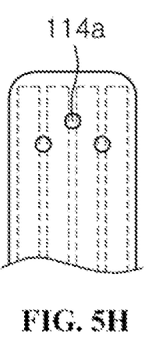
Figure 5I:
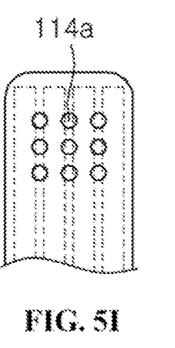

As a further alternative, as shown in FIG. 5F, the connection holes 114 may comprise a plurality of large holes 114a which are arranged in a line and communicate with the first-gas flow channels 112 in such a way that each large hole 114a communicates with two adjacent first-gas flow channels 112. As shown in FIG. 5G, the connection holes 114 may comprise a plurality of large holes 114a which are arranged in a slanted line and communicate with the first-gas flow channels 112 in such a way that each large hole 114a communicates with two adjacent first-gas flow channels 112. As shown in FIG. 5H, the connection holes 114 may comprise a plurality of large holes 114a which are arranged in a bent line and communicate with the first-gas flow channels 112 in such a way that each large hole 114a communicates with two adjacent first-gas flow channels 112. As shown in FIG. 5I, the connection holes 114 may comprise a plurality of large holes 114a which are arranged in a square shape, uniformly distributed over the entire area of the square, and communicate with the first-gas flow channels 112 in such a way that each large hole 114a communicates with two adjacent first-gas flow channels 112.

However, it is more preferable that the connection holes 114 be arranged in the manner of FIG. 3A, 5A or 5B, considering the mechanical strength of the structure, the area of a portion to be sealed, the flow of gas, etc. Among these, it was ascertained that the arrangement of FIG. 3A is most preferable.

As shown in FIGS. 3A and 3B, a sealing groove 116 is formed around the connection holes 114 in an annular shape surrounding the connection holes 114 that are arranged in the circumferential direction. A sealing ring 150 is seated into the sealing groove 116 to prevent gas from leaking out of the cell stack through the connection holes 114. The annular shape of the sealing groove 116 and the shape of the sealing ring 150 have the effect of minimizing the area of a portion to be sealed.

Figure 6A:
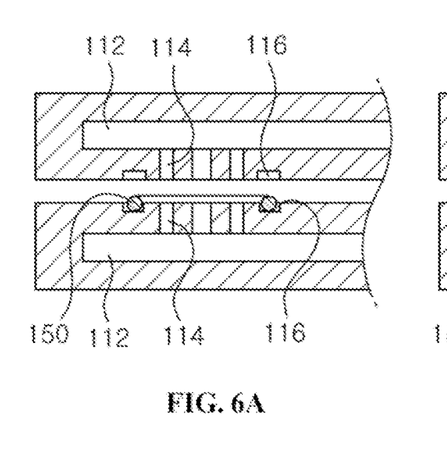
FIGS. 6A and 6B are views illustrating portions around connection holes of adjacent unit cells used in the present invention.
Figure 6B:
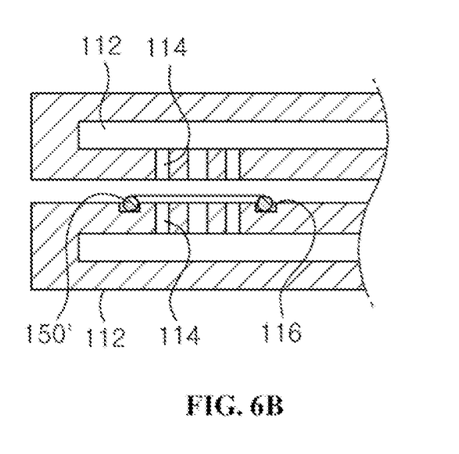

As shown in FIG. 6A, sealing grooves 116 may be respectively formed in facing surfaces between adjacent first unit cells 110 or between each second unit cell 120 (shown in FIG. 4) and the corresponding first unit cell 110. Alternatively, as shown in FIG. 6B, a sealing groove 116 may be formed in either of adjacent first unit cells 110 or in either each second unit cell 120 (shown in FIG. 4) or the corresponding first unit cell 110. Here, the thickness of the sealing ring 150 that is inserted into the facing sealing grooves 116 of FIG. 6A is greater than that of the sealing ring 150' that is inserted into the sealing groove 116 of FIG. 6B. In the case of FIG. 6A where the sealing grooves 116 are formed in the facing surfaces, the effect of preventing gas from leaking out of the cell stack can be further enhanced.

Each sealing ring 150, 150' is made of paste or tape based on ceramic (glass, mica, silica, etc.) or metal (silver, gold, etc.) to prevent a gap from being formed between adjacent unit cells and prevent the sealing ring from melting and flowing at high temperature.

Figure 7A:
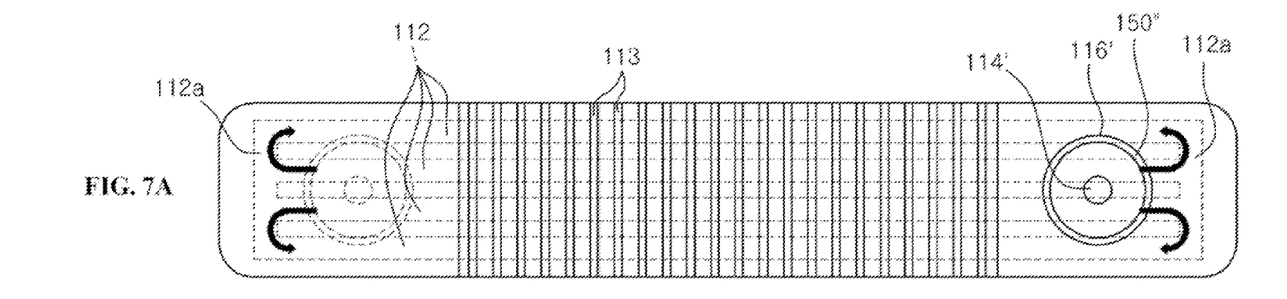
FIGS. 7A and 7B are, respectively, a plan view and a sectional view showing another example of the first unit cell of FIG. 2.
Figure 7B:
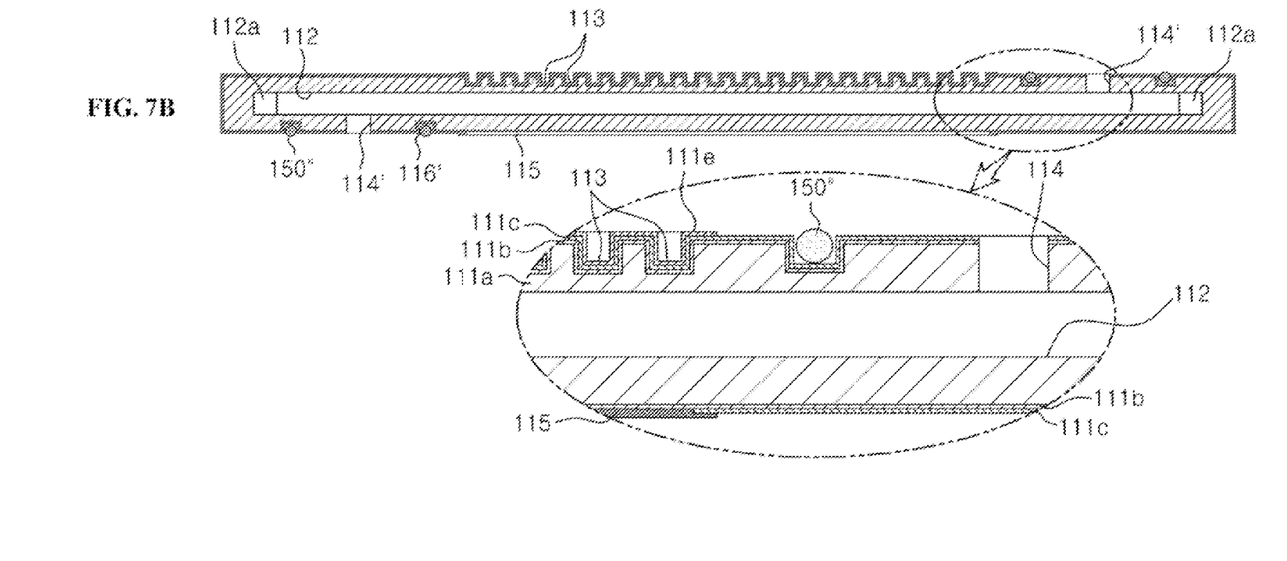

Meanwhile, as shown in FIGS. 7A and 7B, the first-gas flow channels 112 may be configured in such a way that connection passages 112a are formed in the longitudinal opposite ends of the first-gas flow channels 112 to communicate the first-gas flow channels 112 to each other. In this structure, the size of each connection hole 114' or the number of connection holes 114' can be reduced, and the areas of a sealing groove 116' and a sealing ring 150'' can be reduced. Thus, the area of a portion to be sealed can be further reduced. The remaining construction of FIGS. 7A and 7B are the same as the construction of FIGS. 3A and 3B, so that the same reference numerals are used to designate the same components, and further detailed description will be omitted.

Figure 4A:
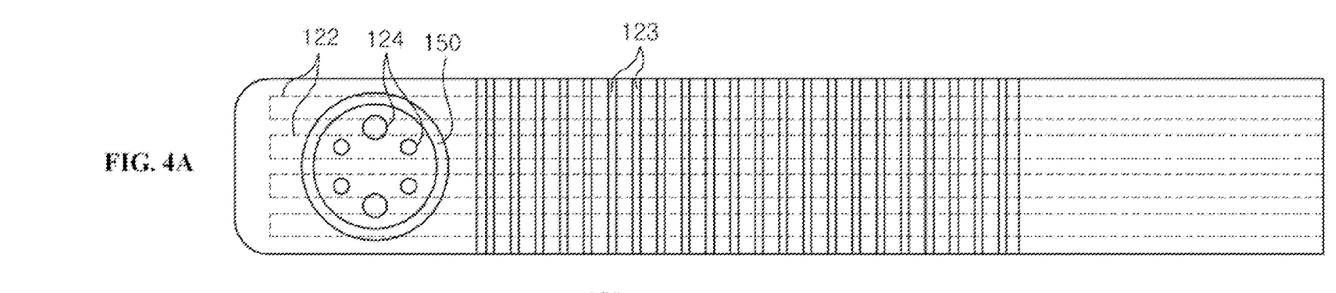
FIGS. 4A and 4B are, respectively, a plan view and a sectional view showing a second unit cell of FIG. 2.
Figure 4B:
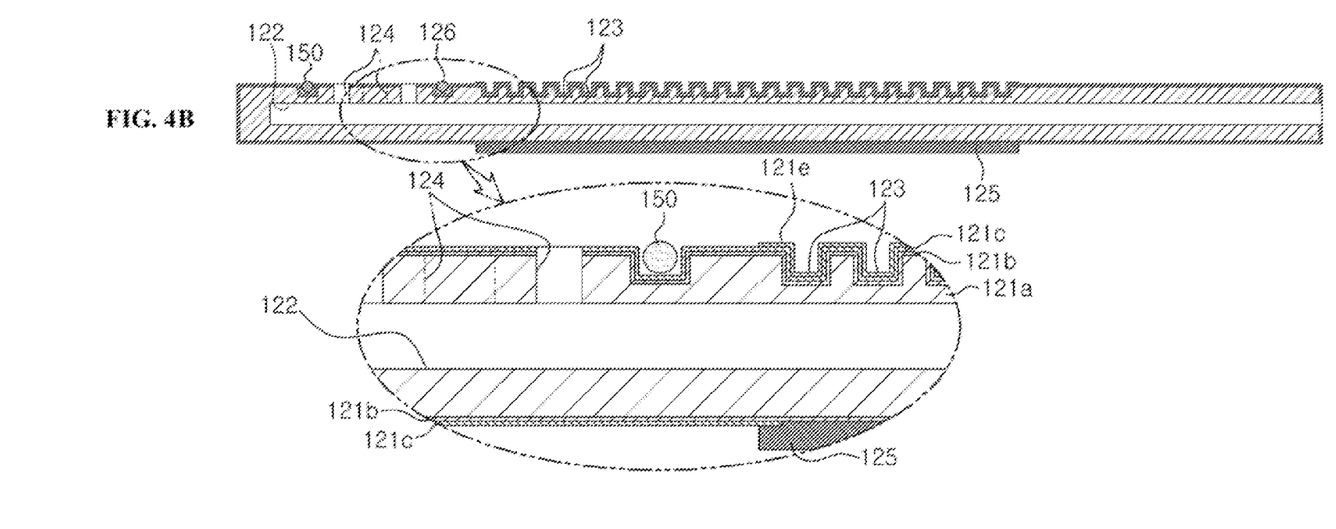

As shown in FIGS. 4A and 4B, in each second unit cell 120, a plurality of first-gas flow channels 122, along which first gas flows, are formed in a first electrode support 121a in the longitudinal direction. A plurality of second-gas flow channels 123, along which second gas (air or oxygen) flows, are formed in an outer surface of one side of the first electrode support 121a in a direction crossing the first-gas flow channel 122 (that is, in the lateral direction of the first electrode support 121a). A plurality of connection holes 124 are formed in first ends of the first-gas flow channels 122 and communicate with the first-gas flow channels 112 of the adjacent first unit cell 110 that is placed on or under the second unit cell 120. Second ends of the first-gas flow channels 112 are open in the longitudinal direction so that they communicate with the first-gas inlet manifold 140 or the first-gas outlet manifold 140'. A ceramic conductor 125 (115) which functions as an electric precipitator to allow electric connection or precipitation is provided on a second electrode layer 121e (or on a first electrode medial layer 121b) at the side in which the second-gas flow channel 123 is formed (or at the other side that is disposed opposite the second-gas flow channel 123).

The second ends (the first-gas flow manifold sides) of the second unit cells 120 and 120' are longer than those of the first unit cells 110 to facilitate the installation of inlet and outlet pipes.

The first electrode support 121a, the first electrode medial layer 121b, an electrolytic layer 121c, the second electrode layer 121e, the connection holes 124, sealing grooves 126 and the sealing ring 150 of the second unit cell 120 have the same constructions as those of the first unit cell 110. Therefore, their detailed explanation will be omitted.

Figure 8:
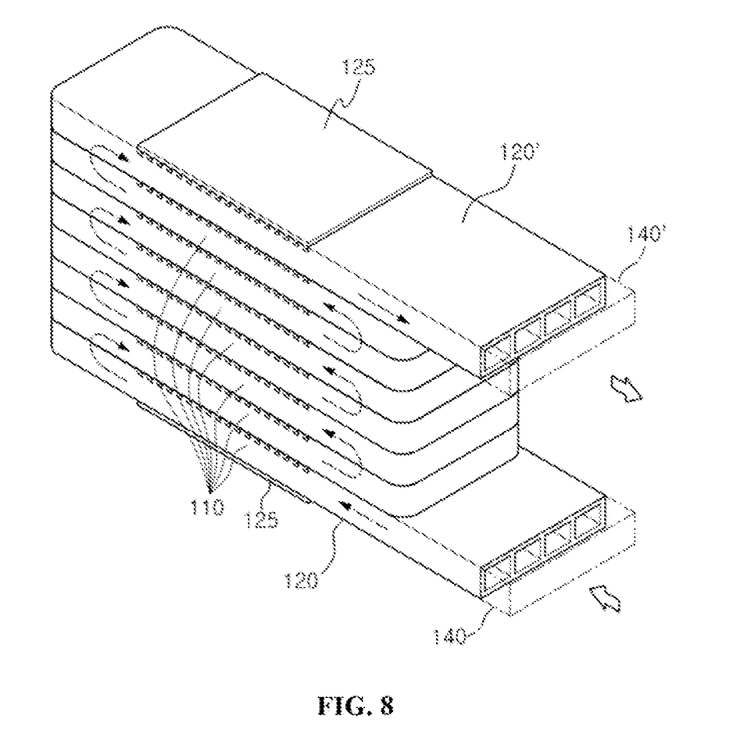
FIG. 8 is a view illustrating the flow of a first gas of the flat-tubular solid oxide cell stack according to the first embodiment of the present invention.

In the flat-tubular solid oxide cell stack according to the first embodiment of the present invention having the above-mentioned construction, as shown in FIG. 8, when it is used as a fuel cell, hydrogen (or hydrocarbon) is drawn into the first-gas flow channel of the lowermost second unit cell 120 through the first-gas inlet manifold 140 and flows through the first-gas flow channels of the first unit cells 110 in a zigzag manner in a direction designated by the arrows before being discharged out of the cell stack via the first-gas flow channel of the uppermost second unit cell 120' and the first-gas outlet manifold 140'. While first gas (hydrogen or hydrocarbon) flows along this path, the first gas reacts with air (or oxygen) that flows through the second-gas flow channels of the first and second unit cells 110, 120 and 120' to generate electricity, and the first gas, along with water that forms, is discharged out of the cell stack through the first-gas outlet manifold 140'. The current is collected by the ceramic conductors 125.

In FIG. 8, when the cell stack is used as a high-temperature electrolyzer cell, vapor enters the cell stack through the first-gas inlet manifold 140, and then generates hydrogen due to an electrochemical reaction (an inverse reaction with respect to the reaction when it is used as a fuel cell) before being discharged out of the cell stack through the first-gas outlet manifold 140'.

Figure 9:
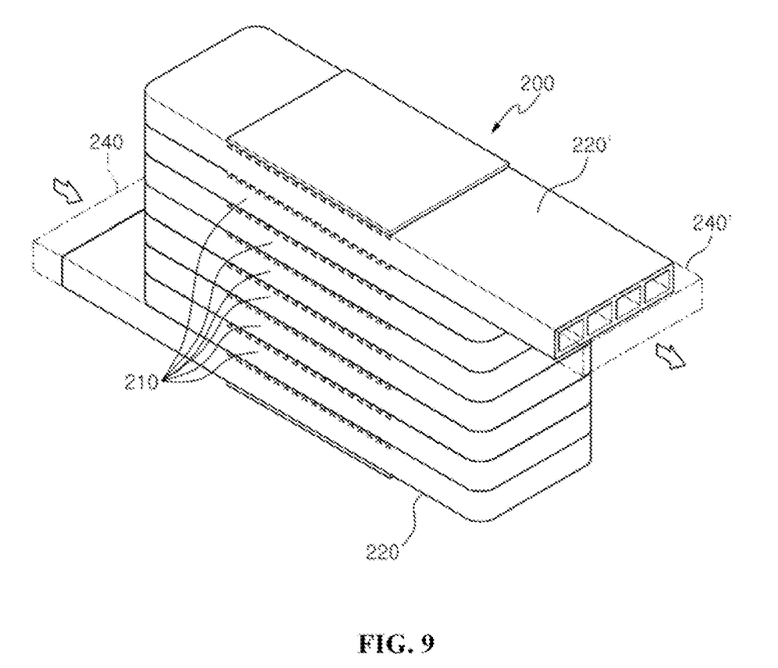
FIG. 9 is a view showing the construction of a flat-tubular solid oxide cell stack, according to a second embodiment of the present invention.

FIG. 9 is a view showing the construction of a flat-tubular solid oxide cell stack, according to a second embodiment of the present invention. As shown in the drawings, the flat-tubular solid oxide cell stack 200 for a fuel cell according to the second embodiment includes a plurality of first unit cells 210 which are stacked one on top of another in the vertical direction, and second unit cells 220 and 220' which are respectively disposed on the lowermost layer and the uppermost layer of the stacked first unit cells 210. First-gas flow manifolds (a first-gas inlet manifold 240 and a first-gas outlet manifold 240') are respectively mounted to the second unit cells 220 and 220' so that first gas (hydrogen or hydrocarbon) enters the first-gas inlet manifold 240 and comes out of the first-gas outlet manifold 240'. In the second embodiment, one ends of the lowermost and uppermost second unit cells 220 and 220' protrude from the first unit cells 210 in the longitudinal opposite directions. The first-gas inlet manifold 240 and the first-gas outlet manifold 240' are respectively mounted to the protruding ends of the lowermost and uppermost second unit cells 220 and 220'. The general construction of the second embodiment other than this structure is the same as that of the first embodiment, therefore further explanation will be omitted.

Figure 10:
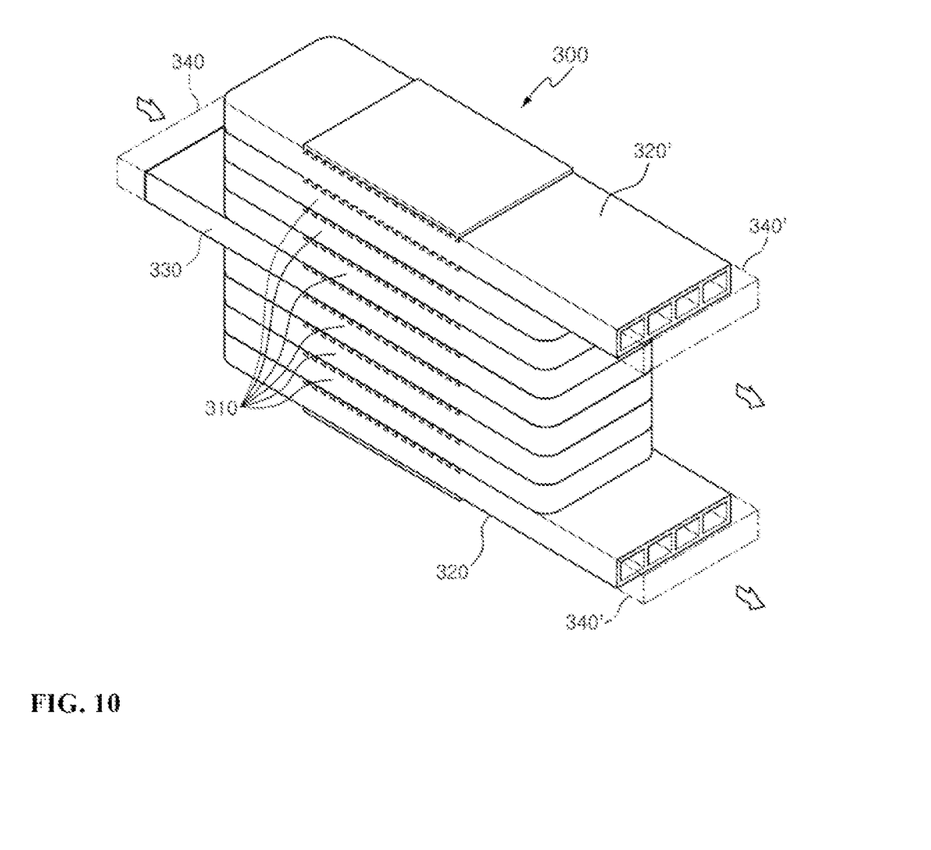
FIG. 10 is a view showing the construction of a flat-tubular solid oxide cell stack, according to a third embodiment of the present invention.
Figure 11:
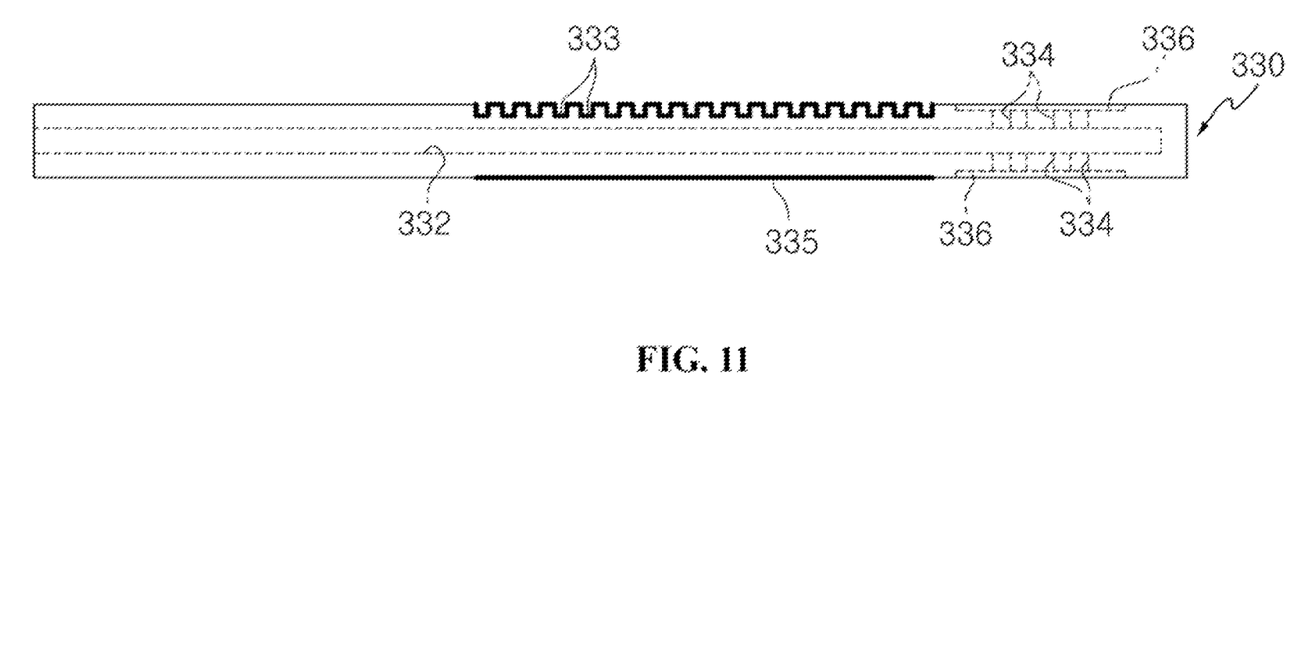
FIG. 11 is a longitudinal sectional view illustrating a third unit cell of FIG. 10.

FIG. 10 is a view showing the construction of a flat-tubular solid oxide cell stack, according to a third embodiment of the present invention. FIG. 11 is a longitudinal sectional view illustrating a third unit cell of FIG. 10. As shown in the drawings, the flat-tubular solid oxide cell stack 300 for a fuel cell according to the third embodiment includes a plurality of first unit cells 310 which are stacked one on top of another in the vertical direction, and second unit cells 310 and 320' which are respectively disposed on the lowermost layer and the uppermost layer of the stacked first unit cells 310. First-gas outlet manifolds 340' are mounted to the respective second unit cells 320 and 320' so that first gas (hydrogen or hydrocarbon) comes out of the first-gas outlet manifolds 340'. Further, a third unit cell 330 is placed at a medial layer of the stacked first unit cells 310. A first end of the third unit cell 330 protrudes from the first unit cells 310 in a direction opposite to the first-gas outlet manifolds 340'. A first-gas inlet manifold 340 is mounted to the protruding end of the third unit cell 330.

As shown in FIG. 11, in the third unit cell 330, a plurality of first-gas flow channels 332 along which first gas flows are formed in a first electrode support (not shown) in the longitudinal direction. A plurality of second-gas flow channels 333 along which second gas (air or oxygen) flows are formed in an outer surface of one side of the first electrode support (not shown) in a direction crossing the first-gas flow channel 332 (that is, in the lateral direction of the first electrode support). A plurality of connection holes 334 is formed in upper and lower surfaces of first ends of the first-gas flow channels 332 that correspond to a second end of the third unit cell 330. The connection holes 334 communicate with the first-gas flow channels of the first unit cells 310 that are placed just on and under the third unit cell 330. Second ends of the first-gas flow channels 332 are open in the longitudinal direction so that they communicate with the first-gas inlet manifold 340. To allow electrical connection, a ceramic conductor 335 is provided on the other side of the first electrode support that is disposed opposite the second-gas flow channels 333. The ceramic conductor 335 is applied to a first electrode medial layer (not shown, see the reference numeral 121b of the first embodiment). The other construction, such as a sealing groove 336, etc., of the third embodiment is the same as that of the first or second embodiment, therefore further explanation is deemed unnecessary.

In the flat-tubular solid oxide cell stack according to the third embodiment of the present invention having the above-mentioned construction, when it is used as a fuel cell, hydrogen (or hydrocarbon) is drawn into the first-gas flow channel of the third unit cell 330 through the first-gas inlet manifold 340, diverges into upward and downward streams through the connection holes 334, and is supplied into the first-gas flow channels of the first unit cell 310 which are placed above and below the third unit cell 330. Subsequently, the hydrogen (or hydrocarbon) flows along the first-gas flow channels of the first unit cell 310 in a zigzag manner and comes out of the first-gas outlet manifolds 340' via the first-gas flow channels of the lowermost and uppermost second unit cells 320 and 320'.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flat-tubular solid oxide cell stack, comprising:
    a plurality of unit cells stacked one on top of another, each of the unit cells comprising a flat-tubular electrode support made of a porous conductive material, with at least one first-gas flow channel formed in the electrode support in a longitudinal direction thereof, first gas flowing along the first-gas flow channel, and at least one second-gas flow channel formed in an outer surface of the electrode support, second-gas flowing along the second-gas flow channel,
    wherein a connection hole is formed on each of opposite ends of the fast-gas flow channel of each of the unit cells and communicates with the first-gas flow channel of an adjacent unit cell, the unit cells being configured to direct the first-gas along one direction in the first-gas flow channel of one of the unit cells, then through the connection hole, and then along an opposite direction in the first-gas flow channel of the adjacent unit cell, so that the first gas flows through each tint-gas flow channel of the unit cells in a zigzag manner in the longitudinal direction of the unit cells, and
    a first-gas flow manifold connected to one end of the first-gas flow channel of each of uppermost and lowermost ones of the unit cells, the first-gas flow manifold being connected to one end of the first-gas flow channel of a middle flat tube unit cell situated in the middle of the stack so that the first gas diverges up and down from a medial portion of the cell stack and then flows along corresponding unit cells in zigzag manners in the longitudinal direction of the unit cells.

2. The flat-tubular solid oxide cell stack as set forth in claim 1, wherein the end of each of the first-gas flow channels of the unit cells to which the corresponding first-gas flow manifold is connected is open in the longitudinal direction of the unit cell.

3. The flat-tubular solid oxide cell stack as set forth in claim 1, wherein a ceramic conductor is attached to an outer surface of each of the unit cells in which the second-gas flow channel is formed or to a surface of the unit cell that is disposed opposite the second-gas flow channel, the ceramic conductor allowing electric connection or precipitation.

4. The flat-tubular solid oxide cell stack as set forth in claim 1, wherein
    an annular sealing groove is formed in each of the unit cells around the connection hole, and
    a sealing ring is inserted into the sealing groove to prevent gas from leaking through the connection hole.

5. The flat-tubular solid oxide cell stack as set forth in claim 4, wherein
    the connection hole comprises a plurality of connection holes arranged in a circumferential direction, the connection holes communicating with the first-gas flow channels, and
    the sealing groove surrounds the connection holes.

6. The flat-tubular solid oxide cell stack as set forth in claim 4, wherein
    the connection hole comprise: a plurality of large holes, each of which communicates with corresponding adjacent two of the first-gas flow channels; and a plurality of small holes, each of which communicates with corresponding one of the first-gas flow channels, wherein the large holes and the small holes are arranged in a circular or semi-circular shape in a circumferential direction, and
    the sealing groove surrounds the large holes and the small holes.

7. The flat-tubular solid oxide cell stack as set forth in claim 4, wherein
    a connection passage is formed in an end of the first-gas flow channels to communicate the first-gas flow channels to each other.

8. The flat-tubular solid oxide cell stack as set forth in claim 4, wherein the sealing groove comprises sealing grooves respectively formed in the adjacent unit cells in such a say as to face each other.

9. The flat-tubular solid oxide cell stack as set forth in claim 4, wherein the sealing ring is made of paste or tape based on ceramic or metal.

\* \* \* \* \*